(12) United States Patent
Hofmann

(10) Patent No.: US 7,655,075 B2
(45) Date of Patent: Feb. 2, 2010

(54) FILTER ELEMENT AND METHOD FOR THE PRODUCTION THEREOF

(75) Inventor: Wilfried Hofmann, München (DE)

(73) Assignee: NFT Nonofiltertechnik Gesellschaft Mit Beschrankter Haftung, Bad Homburg (DE)

( * ) Notice: Subject to any disclaimer, the term of this patent is extended or adjusted under 35 U.S.C. 154(b) by 498 days.

(21) Appl. No.: 10/564,333

(22) PCT Filed: Jul. 3, 2004

(86) PCT No.: PCT/EP2004/007262

§ 371 (c)(1),
(2), (4) Date: Jan. 11, 2006

(87) PCT Pub. No.: WO2005/007276

PCT Pub. Date: Jan. 27, 2005

(65) Prior Publication Data

US 2007/0039471 A1    Feb. 22, 2007

(30) Foreign Application Priority Data

Jul. 11, 2003   (DE) ................ 103 31 709
Nov. 18, 2003   (DE) ................ 103 53 894

(51) Int. Cl.
   *B01D 53/22*   (2006.01)
(52) U.S. Cl. .......... 96/4; 96/11; 96/12; 95/45; 55/523; 55/524; 55/DIG. 5; 210/490; 210/500.21; 210/500.22; 210/506; 216/2; 216/56; 427/245; 427/248.1; 427/370; 427/372.2; 427/532

(58) Field of Classification Search ........... 96/4, 96/11, 12; 95/45; 210/490, 500.1, 500.21, 210/500.22, 506; 216/2, 56; 427/245, 248.1, 427/369, 370, 372.2, 532, 551; 55/523, 524, 55/DIG. 5

See application file for complete search history.

(56) References Cited

U.S. PATENT DOCUMENTS

| 5,139,624 | A  |   | 8/1992  | Searson et al. |
| 5,543,046 | A  |   | 8/1996  | Van Rijn |
| 5,753,014 | A  |   | 5/1998  | Van Rijn |
| 5,882,496 | A  | * | 3/1999  | Northrup et al. ............... 96/11 |
| 6,622,872 | B1 | * | 9/2003  | Tai et al. .................... 210/490 |
| 6,810,899 | B2 | * | 11/2004 | Franz et al. ................... 96/11 |
| 7,112,287 | B2 | * | 9/2006  | Yagi et al. ...................... 96/4 |
| 7,141,096 | B2 | * | 11/2006 | Carboneri et al. ................ 96/4 |
| 7,282,148 | B2 | * | 10/2007 | Dalton et al. .................... 96/4 |

FOREIGN PATENT DOCUMENTS

| CH | 678403 A5 | 9/1991 |
| EP | 0 879 635 A1 * | 11/1998 |
| WO | WO 01/36321 A1 | 5/2001 |
| WO | WO03/068373 A2 | 8/2003 |

OTHER PUBLICATIONS

International Preliminary Report, PCT/EP2004/007262, dated Jun. 8, 2006.

* cited by examiner

*Primary Examiner*—Jason M Greene
(74) *Attorney, Agent, or Firm*—Senniger Powers LLP

(57) ABSTRACT

A method for producing a filter element involving applying a membrane layer to a carrier substrate, etching a membrane chamber, producing pores in the membrane layer, subjecting the membrane layer to an additional treatment to increase the mechanical strength.

32 Claims, 1 Drawing Sheet

FILTER ELEMENT AND METHOD FOR THE PRODUCTION THEREOF

FIELD OF THE INVENTION

This invention concerns a filter element, especially a membrane filter, and a method for producing it.

BACKGROUND OF THE INVENTION

Filter processes can essentially be divided first into a so-called cake filtration, deep filtration and surface filtration. While in cake filtration the filtration is performed by a filter cake formed on a relatively course substrate and in deep filtration the chief filtration effect takes place mechanically by adsorption within a filter medium, in the surface filtration the principle filtration effect takes place mechanically by separation, for example of solid particles on the surface of a filter medium, for example a filter element.

The filter element in accordance with this invention concerns surface filtration, in which the flow into the filter takes place either essentially perpendicular to the filter surface (so-called "static" or "dead end" filtration) or essentially parallel to the filter surface (so-called "cross flow filtration").

In static filtration the retentate (the retained substances) forms a so-called filter cake, in which deep filtration increasingly takes place and which lowers the filter throughput over time. The formation of the cake is for the most part counteracted by a parallel flow over the surface of the filter medium and/or back-flushing through the filter medium.

Membrane filters in particular are suitable for surface filtration. The membrane filters that are most often used today have, for example, polymer membranes (for example, polyester, PP polyester, PVDF=polyvinylidene fluoride, etc.) or ceramide membranes (for example zirconium oxide, SiC, $Si_3N_4$, $Al_2O_3$, etc.). However, such membrane systems have numerous disadvantages. For instance, the distribution of the "pore diameter" is relatively broad in them, due to which the sharpness of separation of the membranes is poor. Substances that are really intended to be retained can then pass through the membrane. In the case of ceramic membranes one additionally runs up against the problem of the relatively low throughput, since these membranes have relatively long "pores" (in comparison with the "pore diameters"; thus more precisely speaking: channels) with high resistance to flow. Moreover, such membrane filters are limited with regard to chemical stability and temperature stability. With some of the said membrane systems there is also the problem of light cake formation (even in cross flow operation) because of the relatively uneven or rough membrane surface. Moreover, some of the said membrane filters are limited with regard to the maximum difference of pressures across the membrane (and thus with regard to an increase of the throughput by increasing the pressure differential).

Membrane filters based on Si or $SiO_2$, $Si_3N_4$, etc. that are produced by etching or lithographing methods have been proposed in recent years.

One example is described in U.S. Pat. No. 5,543,046. This patent describes a method for producing an inorganic membrane that is applied by, for example, CV or sputtering methods to a macroporous carrier with a "flattening layer" initially arranged in between them. In an alternative embodiment a mechanical polishing is also mentioned instead of the "flattening layer." The "flattening layer" is removed after the formation of pores.

Another example is described in U.S. Pat. No. 5,753,014. This patent describes a membrane filter and a method for producing it, in which the macroporous carrier can also consist of an inorganic material such as Si, SiC, $Al_2O_3$, etc. The membrane can also consist of polytetrafluoroethylene (PTFE), Si, C, [sic; SiC], $Si_3N_4$, SiO, $Al_2O_3$, a metal or steel, for example. In this method as well the pores are etched in the membrane layer by techniques that have long been known, for example from the semiconductor industry. After the pores have been formed the membrane is exposed by complete etching of the back side of the carrier layer. In an alternative embodiment the carrier structure can also be formed before producing the membrane. To reduce the tensile stress between the membrane layer and the carrier and for better bonding of them, an intermediate layer such as borax, chromium, nickel, etc., may be used. This patent also describes a pore filler material such as polysilicon, aluminum, etc., that must again be removed at the end of the process. In one embodiment a polyamide layer is structured as a masking layer for the membrane layer by means of a printing method ("imprint" and "liftoff" techniques) with the help of a printing form or in another embodiment the structured polyamide layer itself is used as the membrane layer.

In the case of U.S. Pat. No. 5,139,624 the pores are produced by wet chemical means.

In general one should note that filter elements made of at least two layers (a carrier layer and a membrane layer) have the problem that the coating methods mostly produce chiefly or completely amorphous layers, which is disadvantageous for mechanical strength.

$Si_3N_4$ is a material that is currently often used as the membrane layer. The prior art, however, shows that at present it is difficult to produce an $Si_3N_4$ layer with internal crystalline structure that goes beyond larger crystal nuclei, at temperatures under about 1400° C. The current art is at the laboratory and experimental level. The carrier structures of the filter elements mostly consist of Si, whose melting point is 1420° C. The heating/annealing of $Si_3N_4$ that is needed to produce a high crystalline fraction therefore would damage or even destroy the carrier structure.

The production of very thin membranes (<1 μm) with pore diameters <1 μm that nevertheless are stable with respect to relatively high pressure (>1 bar) with the currently known methods is difficult and has a high reject level. The limitation with respect to the ability to withstand pressure, which also is connected with the relative porosity and membrane thickness, makes filtration with high throughput expensive.

SUMMARY OF THE INVENTION

The task of this invention is to create a membrane filter and a method for producing it that avoid said disadvantages. In particular, a filter element is to be designed that is mechanically stable while having high throughput and that withstands pressure loads, including pressure variations, over a long useful life.

This task is solved by the characteristics given in Claims 1 and 24. Advantageous embodiments and further developments of the invention can be learned from the dependent claims.

DETAILED DESCRIPTION OF THE INVENTION

Figure 1:
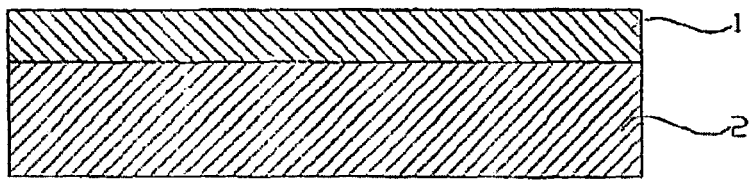
FIG. 1 shows a cross section of a membrane element after the first process step.

This application claims priority of German application 103 31 709.0, filed Jul. 11, 2003 and German application 103 53894.1, filed Nov. 18, 2003, the entire disclosure of which is hereby incorporated by reference.

A method for improving a mechanical improvement of the permissible mechanical stress of the filter element can be achieved by:
1. favorable geometry of the membrane,
2. an increase of the permissible mechanical stress or the strength of the membrane material by
  2.1. an internal prestressing of the membrane and
  2.2 crystal structures in the membrane material, and
3. compacting the membrane material.

A general solution consists of making the membrane layer from a material that achieves a sufficiently high crystalline fraction (>50%) at temperatures under the melting point of the carrier material (under about 1400° C. in the case of Si). SiC (especially) presents itself in this regard.

Crystal formation begins at relatively high temperatures in $Si_3N_4$. Thus, a degree of crystallization of greater than 90% is seen at a temperature over about 1400° C. In view of the comparable melting material of the Si carrier material crystal formation must be initiated and carried out to a sufficient degree of crystallization at a lower temperature, as far as possible under about 1350° C. For $Si_3N_4$ there are some methods available. The most important of these methods have in common the fact that additional energy is introduced into the growing coating film.

These methods include, among others coating with ion bombardment (preferably with Ar ions) or magnetron sputtering methods, coating methods in combination with high frequency coupling and another advantageous coating method that is called HW-CVD (English: hot wire CVD) or also Cat-CVD (English: catalytic CVD). The various coating methods are explained in more detail below.

After using these methods in most cases it is necessary to carry out a thermal secondary treatment in order to increase the low degree of crystallization (crystal nuclei) to the necessary value. For this the coated substrate is heated to temperatures above 1000° C. for in some cases several hours.

This procedure is costly (for Si as carrier material), cost-intensive, requires in some cases new and, moreover, expensive coating plants or even the further development of existing coating plants.

Another possibility for generating mechanically stable thin films is to switch to a different coating material that has a lower crystal formation temperature and can be processed in correspondence with the same production methods for a filter element that were described above. One such material is silicon carbide (SiC).

In the case of SiC, crystal formation begins at about 400° C.; at temperatures above 1000° C. a crystal fraction of more than 85% is expected with sufficient treatment time. The E modulus of SiC is about 300 GPa and after such treatment can reach about 370-430 GPa with bending strength by use over 1000 MPa. Crystals with measurements between a few nanometers, for example 5 nm, up to over 50 nm can be formed, which is advantageous for the goal of increasing a mechanical strength and inhibiting cracking and propagation.

Another improvement can be achieved by applying a (subsequent) membrane layer of a composite of, for example, SiC and $Si_3N_4$. Ending strength values of clearly over 1100 MPa can be achieved with such composite systems.

A method for producing the filter element consists of the following steps:
  S1) application of a membrane layer to a carrier substrate,
  S2) etching a membrane chamber on the side of the carrier substrate opposite the membrane layer, so that a residual layer of the carrier substrate still remains,
  S3) producing pores in the membrane layer by means of a lithographic and etching process in order to create a perforated membrane,
  S4) removal of the residual layer by etching in order to expose the membrane layer,
  S5) the membrane layer is subjected to an additional treatment to increase the mechanical strength during step S1 or in a subsequent step.

As noted, the permissible mechanical stress of the membrane material can be increased by compaction of the membrane material, generation of internal prestress and/or by crystal structures in the membrane material (in addition to a favorable choice of the membrane geometry, which will be discussed later).

In an embodiment example the increased strength is achieved by the membrane layer having an internal mechanical prestress. With this prestress the membrane layer is, so to speak, tensioned over the membrane chamber and through this can accept higher pressures perpendicular to its surface.

The prestress of the membrane layer is determined, for example, by the coating method that is used to apply the membrane layer (for example, of $Si_3N_4$ or SiC). LPCVD methods ("low pressure chemical vapor deposition") that operate at process pressures of 10-100 Pa and temperatures in the range of about 400-900° C. are especially suitable for this.

The internal prestress of the membrane reduces the so-called Von Mises stress in the membrane when the membrane is under pressure loads considerably; in an embodiment example by about 80% of the pre-established membrane stress. Moreover, the internal prestress of the membrane also reduces the elongations in the membrane that occur under pressure loads. The prestress of the membrane should be greater than about 10 MPa, preferably greater than 100 MPa.

In another embodiment example the membrane layer has nano- and/or microcrystalline structures.

Crystal structures can be produced in several ways. In many coating processes the coating is applied to the carrier in practically completely amorphous form; however, in some methods at least crystal nuclei are generated even during the coating and these are especially advantageous for subsequent treatment (in accordance with step S5).

Especially suitable coating methods for producing thin layers are for the time being roughly divided into the so-called CVD (chemical vapor deposition) and PVD (physical vapor deposition). In CVD methods thin layers of a solid material coming from the gas phase are deposited onto a substrate by chemical reaction (for example, thermal decomposition at high temperatures). In CVD methods, therefore, a prerequisite is the existence of gaseous compounds, so they can react with each other, with one of the reaction products being the substance that is used for the coating. All other reaction products are gaseous can therefore can easily be transported away.

The CVD methods can be divided in other particular CVD methods are that known in the prior art, for instance APCV processes (atmospheric pressure CVD), LPCVD processes (low pressure CVD) with pressures from 10-100 Pa, RPCVD (reduced pressure vapor phase epitaxy) at pressures from 1-10 kPa, PECVD processes (plasma induced CVD), laser induced CVD as well as reactive variations of the sputtering technique and evaporation technique.

In nPVD processes the substrate is coated by deposition of a vapor onto a substrate, where the vapor is physically generated (for example by evaporation, cathodic atomization or sputtering, molecular beam epitaxy). A PVD process essentially consists of the three phases: generation of particles, transport of particles and deposition or condensation of particles; on the substrate. An important property of PVD processes are the high vacuums ($10^{-8}$-10 Pa) in which the PVD processes are carried out.

During the application of the membrane material a suitable, at the smallest, formation of crystal structures or crystallization nuclei can be initiated and promoted.

As is known, in CVD methods the fraction of crystal structures in the deposited layer increases with increasing carrier or substrate temperature (for example, at temperatures over 400° C. in LPCVD processes). In PECVD processes the substrate temperature can be raised to about 1350° C. and a crystalline membrane layer (for example of SiC) with degree of crystallization over 75%, in special cases nearly 100%, can be created.

Another possibility for generating, at the least, crystallization nuclei during the coating itself (but also afterwards) is to bombard the substrate with ions, for example Ar ions. The ion bombardment in this case takes place at temperatures of a few hundred ° C. The incident ions deposit their energy at the point of impact. Other known measures for supporting the formation of crystal nuclei, besides ion bombardment, are laser irradiation and electromagnetic radiation, for example with radiowaves (for example magnetron sputtering at 13.65 MHz). This introduction of energy into the membrane material also promotes the formation of crystallization nuclei at lower temperatures.

In the HWCVD method the development of crystallization nuclei in the membrane material is also initiated and distinctly enhanced at lower CVD coating temperatures. In the HWCVD method very hot (temperatures above 1800° C.) tantalum wires generate, in a reaction chamber close to the surface to be coated, free radicals of silan ($SiH_4$) and ammonia particles ($NH_3$) that serve as crystallization nuclei in the coating material and also for other possible treatment steps.

After application of the membrane material to the carrier the crystalline fraction can likewise be further clearly increased through the following measures:
 a) sintering under pressure or nearly without pressure
 b) ion bombardment
 c) isostatic hot pressing
 d) a combination of a), b) and c).

In one embodiment of the method for producing filter elements in accordance with the invention, the membrane layer (subsequently) applied to the carrier structure is sintered by introduction of energy (for example an increase of the temperature). For example, in the case of an $Si_3N_4$ membrane layer crystalline growth promoted by crystallization nuclei that are possibly already present begins at temperatures around 1450° C. Elongated $Si_3N_4$ crystals, the so-called $\beta$-$Si_3N_4$, form. The crystal sizes lie in the range of about 20-50 μm. With increasing temperature as well as increasing heating time the $\beta$-$Si_3N_4$ fraction rapidly increases and reaches a value over 90% above about 1750° C. Compaction of the $Si_3N_4$ layer goes hand in hand with the sintering operation because of a reduction of volume at the crystal boundaries. Above about 1500° C. the density can reach as much as 90% of the theoretically possible value.

Sintering aids such as $Al_2O_3$ and/or $Y_2O_3$ (for example each about 5 wt %) can be added during the sintering operation.

In another embodiment the $\alpha$-$Si_3N_4$ is heated by electromagnetic radiation, for example microwaves (above 25 GHz, for example) or radiowaves. An important advantage of sintering with electromagnetic radiation is that the energy is deposited in nearly the entire sample volume and not as in the traditional case by means of thermal conduction from the surface or crystal surface into the volume. The sintering aids support the coupling of energy even more. In this variation crystal growth ends at temperatures about 100-150° C. lower than with the previously described traditional sintering methods. Thus, crystal growth in this case already begins at about 1350° C., and at about 1600° C. the $Si_3N_4$ is more than 90% in crystalline form. The compaction also begins at correspondingly lower temperatures and stops at a maximum value of over 90%. The radiation peak is preferably in the vicinity of at least one peak of the absorption curve of the coating material.

In the formation of the crystalline phase care should be taken that a certain amorphous residual fraction (a maximum of 10%, for example) remains in the $Si_3N_4$ layer, since otherwise the grains of the $\beta$ phase become too large and in the end the layer becomes brittle again.

If SiC is chosen as the coating material for the subsequent membrane layer, the sintering operation can be carried out at clearly lower temperatures (even under 1400° C.) with pronounced formation of crystal grains. From this one can assume that a degree of crystallization of at least 10% is already achieved starting at temperatures of 900° C. Longer sintering time likewise contributes to higher degrees of crystallization. With that a mechanically highly stable membrane layer can also be produced on a carrier structure of silicon.

The effect of such a sintering operation on the mechanical strength of the membrane layer is, among other things, a distinct increase of the tensile strength. The tensile strength is 500-600 MPa for unsintered $Si_3N_4$, while after sintering it exceeds 1100 MPa. This is the reason for the clear increase of the resistance of the membrane layer to pressure.

In another embodiment the membrane layer can be additionally compacted by isostatic hot pressing, for example. The pressing operation is carried out, for example, at temperatures over 750° C. and pressures over 100 bar. This process can also take place after a sintering treatment. Here the grain structures remain nearly unchanged, but the porosity clearly decreases, and the tensile strength can rise to a value above 1100 MPa.

The described sintering treatments can be carried out either before or after the structuring (formation of pores) of the membrane layer.

The isostatic hot pressing is carried out on the unstructured membrane layer.

The thickness of the membrane is less than 50 μm, preferably less than 1 μm.

The pore diameters are less than 50 μm and are preferably less than 1 μm. An "elemental cell" (=a unit of surface of the membrane with one pore) has an area greater than or equal to (pore diameter)$^2$.

The important properties of the filter element are:
 a relatively thin suspended membrane with low aspect ratio (membrane thickness:pore diameter)(→high throughput) and
 a relatively high mechanical strength or resistance to pressure.

The following steps of the method are decisive for this:

etching in several steps, where a residual layer of the carrier structure (for example, an Si layer) is temporarily left behind for the formation of the pores in the membrane layer and this residual layer is not removed until after the pore formation (with or without intermediate supporting structures) and formation of a crystalline structure of the membrane layer material, which greatly inhibits crack formation or crack formation or crack growth and highly increases the tensile strength. This takes place through sintering processes and/or isostatic (hot) pressing, in addition to an appropriate choice of the process parameters for the coating process (temperature, pressure, etc.). Here it should also be noted that in some cases the sintering step or steps can also be carried out after the pore formation in the membrane.

The internal prestress of the membrane reduces the internal Von Mises reference stress and with that the bending stresses in the membrane layer (by around 300 MPa in some model cases). First the formation of crystal structures is crucial for the production of our filter elements. A certain low prestress in the membrane layer is (1) necessary in the case of a suspended membrane (for its "tightening") and (2) in each case according to the process parameters of the coating process, is a useful "accompanying phenomenon" (often about 100 MPa or higher).

It should be noted that the step (after the formation of pores in the membrane layer) in which the residual layer of the Si carrier structure is removed can be carried out not only (as described above) by an additional etching of the back side (the side of the carrier structure), but also out through the pores that have formed from the membrane side. Then under the perforated membrane layer there takes place an undercut etching in which the residual layer is removed and thus the perforated membrane is exposed. The etching materials that are used for this should, of course, not attack the membrane layer. Possibilities here are, among other things, dry etching processes, for example with $SF_6$, $CCl_2F_2+O_2$, $NF_3$ and mixtures of isotropic and anisotropic etching substances.

The Si deep etching creates membrane chambers that are each covered by a suspended membrane. The circumferential shape of the membrane chambers is in principle not limited. Thus, the membrane chambers can be made square, rectangular, diamond shaped, etc. However, the measurements of the membrane chambers are determined by the general stability of the overall filter element which is essentially provided by the Si carrier structure.

With an appropriate choice of the Si substrate the sides of the membrane chambers (viewed in cross section) can be made to be perpendicular (for example (110)-Si) or sloping (for example (100)-Si).

Strength tests also show that the resistance of the membranes to pressure is considerably affected by only one side length of the membrane. For this reason in a preferred embodiment the membrane chambers are formed to be long slots, since the small side lengths in particular affect the pressure stability and fracture behavior of the membrane. In one embodiment the span widths in this direction are preferably on the order of a magnitude of about 100 μm. The large side length is essentially not limited—with the exception of the general stability of the overall filter element. Thus, in principle the slot shaped membrane chamber can extend over the entire length of the filter, which contributes favorably to the porosity of the filter element.

In other embodiments the Si deep etching can be carried out in more than two steps in order to build in intermediate supporting structures in the case of larger membrane span widths and/or higher porosity. In the first step of the Si deep etching a larger base area of the subsequent membrane chamber can be structured or etched, and here, too, a residual layer of the Si carrier material is initially left behind. In one possible method the membrane is now formed on the front side as described. Then the residual layer of the Si carrier on the back side is coated with a masking layer (for example photo varnish), which is then structurized by the appropriate lithographic process. The structure in the masking layer created in this way is then used to etch away the residual layer of the Si carrier that is accessible through the structured masking layer. The parts of the residual layer of the Si carrier material that are protected against etching by the structured masking layer now form intermediate support structures that improve the stability of the membrane in the larger membrane chamber. Through this embodiment the porosity of the filter element can be considerably increased (by increasing the membrane chamber area).

This multistep method for Si deep etching can as needed be extended along the same principle to more than the two or three etching steps described in this document. The conduct of the first step of the Si deep etching before producing the membrane improves the parallelism of the production process for the filter element and thus the economic efficiency.

Another advantage of the multistep process for Si deep etching is that the residual layer of the Si carrier material that is temporarily present can readily take up and dissipate the stresses in the membrane, which is especially important in the case of membrane layers with internal prestress and/or, for example, when additional temporary intermediate layers are present (for example metallic sacrificial layers like NiCr, Cu, etc.). Moreover, this residual layer makes up stresses that temporarily arise in the membrane layer that may arise during pore formation in the membrane, since in the pore etching not all the pores become opened at the same time. In addition, the residual layer improves the ease of handling of the overall filter element structure during the production of the filter. All of this reduces the reject level considerably.

Another advantage (besides, among other things, the parallelizability of the process step) of a back side etching before the formation of the pores in the membrane is that in this way a hierarchy of intermediate supports can be created relatively easily.

In the last etching step to expose the perforated membrane layer the membrane side of the filter element as a rule is protected against the etching agent. This takes place, for example, through the use of the so-called "etching can", which covers the front side (membrane side) of the structure. Another possibility is to cover the front side of the perforated membrane by an agent, for example Al, that at least partially fills the pores. This keeps, for example, hydrogen formed in the last etching step from destroying the membrane layer or the membrane layer that has formed from being attacked and altered by the etching medium. The pressure of hydrogen or, generally speaking, a gas bubble in pores with a diameter d satisfies the rule of thumb $P \cong 3.5$ bar/$d_{1\mu m}$, i.e., if d=1 pressure of about 3.5 bar exists in the pore, while at d=0.5 there is a pressure of 7 bar in the pore! This measure considerably reduces rejects in the production of filter elements.

In the first process step a membrane layer 1 is applied to a carrier layer 2 in accordance with FIG. 1. The carrier layer 2 is in this case an Si substrate, for example. The application of the membrane layer 1, which consists of $Si_3N_4$, SiC or a combination thereof, for example, preferably takes place by a CVD method (for example LPCVD or PECVD) or PVD method (for example sputtering). In this embodiment example this takes place on one side. However, it can also take place on both sides. The thickness of the membrane layer can be, for example, 500 nm or more. The carrier layer 2 can be a traditional Si wafer, as it is known from the semiconductor industry.

Figure 2:
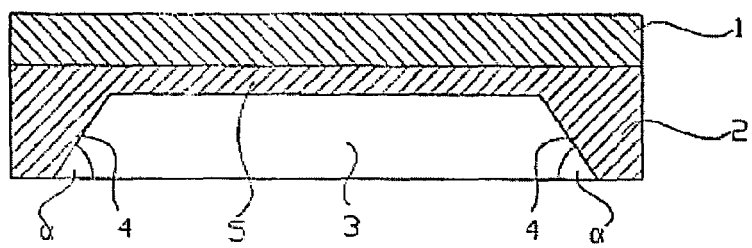
FIG. 2 shows a cross section of a membrane element after the second process step.

In the second step shown in FIG. 2 an Si deep etching is carried out on the back side, thus on the side of the carrier layer that is opposite the membrane layer 1. For this first the back side is coated with a resist layer (for example a photo varnish), which is then structured, preferably, by means of photolithography. The structure in the resist layer is transferred to the layer lying under it by means of, for example, RIE dry etching. In the case of substrates that are coated on both sides (with $Si_3N_4$ or SiC) this is the $Si_3N_4$ or SiC coating that is present on the side opposite the latter membrane side. The transfer of the resist structure to the back side coating is followed by the actual Si deep etching with, for example, NaOH (NaOH wet etching at 80° C., for example; etching time about 7-8 hours). If the structure is coated only on one side (on the side of the later membrane), the NaOH wet etching takes place immediately after the resist structuring. This wet chemical etching shows a strong directional dependence of the etching rates with respect to the crystal direction of the substrate. The so-called (111) areas are etched 100 times more slowly than other surfaces, which affords, in the case of a (100)-Si wafer sloping sides 4 with an angle α of 54.76° in the case of (100)-Si. In the case of (110)-Si the sides are steeper, i.e., essentially vertical. The etching rate is about 1 μm/minute. In one embodiment this etching step is stopped at a residual Si carrier layer thickness of about 30 μm, so that a residual layer 5 remains. Incidentally, in this step the coating ($Si_3N_4$ or SiC) is thinned to, for example, about 600-800 nm.

In the third main step (S3) a so-called metallic sacrificial layer such as NiCr, Cu, etc., is first applied in a thickness on the order of 150 nm and serve as an etching mask in the structuring of the actual membrane layer ($Si_3N_4$ or SiC layer). Then gold (Au), for example, can be applied and photolithographically and wet chemically—as known—structured to crosses or similar markings to improve the adjustability of the overall wafer. These markers have high contrast power, so the wafer can be better positioned. Now a 500 nm thick tempered varnish layer is lithographically structured in the usual way to the desired pore pattern.

Figure 3:
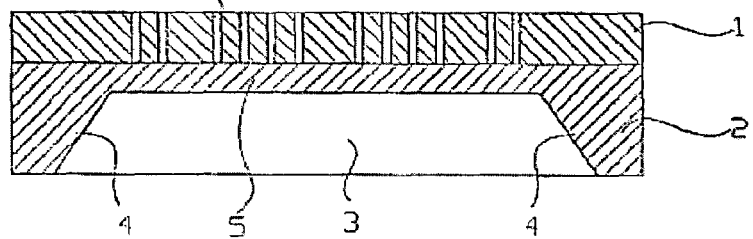
FIG. 3 shows a cross section of a membrane element after the third process step.
Figure 4:
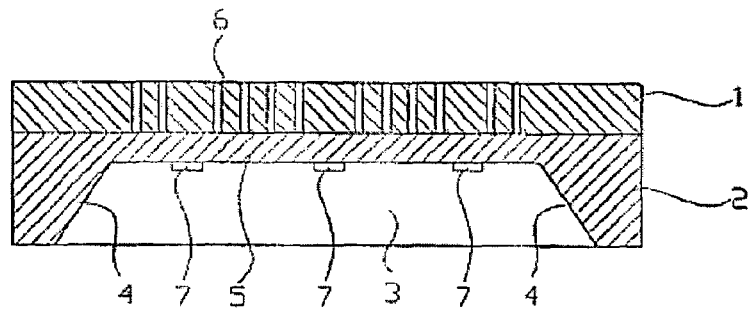
FIG. 4 shows a cross section of an embodiment example after the third and before the fourth process step of Claim 1.
Figure 5:
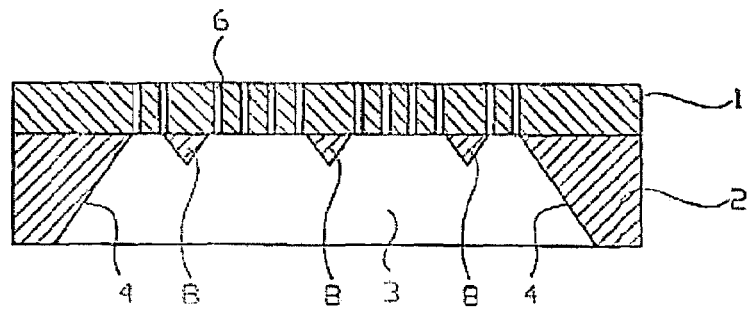
FIG. 5 shows a cross section of the embodiment example after the fourth process step.

The transfer of the pore pattern into the membrane layer (of, for example, $Si_3N_4$ or $Si_3$) takes place in one embodiment in two dry etching steps: in the first partial step (S3-1) the varnish structure is transferred to the metal sacrificial layer by means of, for example, Ar—IBE (Ar Beam Ion Etching) and in a second partial step (S3-2) the pore structure in the metallic sacrificial layer is transferred into a membrane layer, for example, by ECR-RIE (etching gas, for example $CF_4/O_2$) (see FIG. 3). Other known etching techniques can be used in each case according to equipment or other process details.

In the fourth main step (S4) the back side Si deep etching is now completed, i.e., the residual layer 5 which in this case is about 30 μm, is removed, in order to expose the membrane layer 3 from the below. Then first the residual metallic sacrificial layer from the main step S3 can be removed in order to avoid the introduction of any stresses from this sacrificial layer into the membrane. This Si deep etching step is carried out, for example, with TMAH (tetramethylammonium hydroxide) at about 80° C. and in an etching time of about 1 hour, since TMAH attacks the membrane layer less than NaOH does. Other known etching methods of course can also be used.

In the case of pore diameters under about 1 μm the gas formation that occurs in this etching step can lead to tearing of the membrane. For this reason in one embodiment the membrane is protected from the etching medium using a so-called "etching can." For this the membrane side of the wafer is tightly bonded to, for example, a Petri dish-like container. In another embodiment the pores are filled with a material such as Al (and the front side of the membrane is also covered) in order to avoid tearing by gas formation. After the end of the Si deep etching this material is removed from the front side of the membrane and from the pores, for example, by another etching process, other chemical treatment or, for example, simple heating.

During the first step S1 or in a layer step the membrane layer is subjected to a separate treatment (namely a pressure, ion bombardment and/or heat treatment). Preferably the ion bombardment and/or heat treatment take place at the same time as the application of the membrane layer, thus in step S1, or at a later time, for example, not until after step S4. Isostatic hot pressing is preferably carried out between step S1 and S2.

For completion the filter elements still joined on the wafer are separated, for example, by conventional sawing or breaking, along breakage edges (intentional breakage sites) created beforehand by etching, for example.

The membrane chambers 3 can, as already noted, viewed from the back side, have many different contours. In one preferred embodiment the membrane chamber has the form of a long slot, which is covered for the most part by a membrane. The chamber slot in one embodiment has a length of about 2100 μm and a width of 100 μm.

In order to increase the porosity or membrane area per filter element it is possible according to one embodiment to create main membrane chambers of larger size (>100 μm) by introducing smaller intermediate supports 8 at distances of about 100 μm; this can take place by carrying out step S2 over a larger area. After this Si deep etching is stopped, this residual layer, which can also have a thickness greater than the 30 μm indicated above, is again suitably structured (with or without a thin metallic sacrificial layer), and so forth. This can in principle be repeated a number of times (steps S2-i, i=1 . . . n) in order to generate increasingly more complex intermediate supports. However, it is preferably for the reasons already mentioned if a residual layer 5 always remains before the formation of pores 6 and is not removed until the end.

Because of the particular strength of an SiC membrane layer a membrane with pore diameters <0.4 μm can be produced more simply and with good yield in approximately the same aspect ratio (instead of 0.45 μm pore diameter:0.80 μm membrane thickness, for example 0.2 μm (or smaller):0.4 μm (or smaller)).

Because of the good strength of an SiC membrane layer in some cases it is possible to omit the residual layer 5 in step S2, since the high-strength SiC layer can accept the stresses that arise in pore etching without damage. In this case S4 is omitted, which makes the method for producing a filter element simpler, shorter and cheaper.

In view of the above, it will be seen that the several objects of the invention are achieved and other advantageous results attained.

As various changes could be made in the above methods and products without departing from the scope of the invention, it is intended that all matter contained in the above description and shown in the accompanying drawings shall be interpreted as illustrative and not in a limiting sense.

What is claimed is:

1. A method for producing a filter element that includes the following successive steps:

1) application of a membrane layer to a carrier substrate,
2) etching a membrane chamber on the side of the carrier substrate opposite to the membrane layer, so that a residual layer of the carrier substrate still remains,
3) generation of pores in the membrane layer by means of a lithographic and etching process in order to create a perforated membrane,
4) removal of the residual layer of the membrane chamber by etching in order to expose the membrane layer of the membrane chamber, and
5) subjecting the membrane to an additional treatment in order to increase its mechanical strength, which additional treatment consists of one or more the following:
5.1) formation of crystal nuclei in the membrane layer in step 1,
5.2) heating temperature treatment of a structure of carrier layer and membrane layer in order to increase the crystalline fraction in the membrane layer in step 1 and/or after step 4,
5.3) isostatic hot pressing of the structure of carrier layer and membrane layer to increase the crystalline fraction in the membrane layer prior to step 3 or after step 4, and
5.4) generation of an internal prestress in the membrane layer in step 1 or after step 4.

2. A method as in claim 1, wherein the treated membrane layer has a crystalline fraction of at least 25%.

3. A method as in claim 1, wherein the membrane layer is applied to the carrier substrate by means of a chemical vapor deposition process (CVD process).

4. A method as in claim 1, wherein the membrane layer is applied to the carrier substrate by means of a physical vapor deposition process (PVD process).

5. A method as in claim 1, wherein the membrane layer consists of a ceramic material.

6. A method as in claim 5, wherein the membrane layer consists of a non-oxide ceramic.

7. A method as in claim 6, wherein the membrane layer consists of a nitride non-oxide ceramic.

8. A method as in claim 7, wherein the membrane layer consists of $Si_3N_4$.

9. A method as in claim 6, wherein the membrane layer consists of a carbide non-oxide ceramic.

10. A method as in claim 9, wherein the membrane layer consists of SiC.

11. A method as in claim 1, wherein the heating temperature treatment is performed and is performed by holding the membrane layer in a temperature range of about 200° C. to 2000° C. at a process pressure of about 5 Pa-100 Pa absolute.

12. A method as in claim 1, wherein the heating temperature treatment step is performed and is performed and is a sintering at temperatures over about 900° C.

13. A method as in claim 1, wherein the temperature treatment is performed and is carried out by means of electromagnetic radiation in the radiowave or microwave range.

14. A method as in claim 13, wherein the microwave radiation lies in the frequency range above 25 GHz.

15. A method as in claim 13, wherein the isostatic hot pressing is performed and is carried out at temperatures above about 750° C. and pressures above about 100 bar.

16. A method as in claim 1, wherein the isostatic hot pressing step performed and is carried out prior to step 3.

17. A method as in claim 1, wherein the membrane layer is protected against etching agents after step 3.

18. A method as in claim 17, wherein the membrane is protected by a solid masking.

19. A method as in claim 17, wherein the membrane layer is protected by a coating material that is again removed after step 4.

20. A filter element with a membrane layer and a carrier layer, where the membrane layer has a plurality of perforations, wherein in the carrier layer a membrane chamber is exposed, the membrane layer spans over the membrane chamber, and the membrane layer material has a compacted and/or at least partially crystalline structure with strength that by a treatment has been increased over that of the membrane layer material prior to the treatment; wherein the increased strength of the membrane layer is produced through an internal mechanical prestress.

21. A filter element as in claim 20, wherein the membrane layer has microcrystalline and/or nanocrystalline structures and/or has been compacted.

22. A filter element as in claim 20, wherein the carrier substrate has a plurality of membrane chambers, each of which is spanned over by one and the same membrane layer.

23. A filter element as in claim 20, wherein the membrane chamber is rectangular in plan view.

24. A filter element as in claim 23, wherein the membrane chamber in plan view has the shape of a slot, whose length is at least twice its width.

25. A filter element as in claim 20, wherein two oppositely lying sides of the membrane chamber run at an angle of less than 90° to the plane of the membrane.

26. A filter element as in claim 20, wherein the pore ratio of the thickness D of the membrane and pore diameter P have the following relationship: $0.01<D/P<100$, where the following applies for the thickness D of the membrane: $0.01\ \mu m<D<100\ \mu m$.

27. A filter element as in claim 20, wherein the pores are essentially circular in shape and have a diameter in the range between 0.01 μm and 100 μm.

28. A filter element as in claim 20, wherein the membrane layer, on a side turned toward the membrane chamber, lies on at least one intermediate support, the thickness of which is less than the thickness of the carrier substrate.

29. A filter element as in claim 20, wherein the membrane chamber essentially extends over the entire area of the filter element.

30. A filter element as in claim 20, wherein the carrier substrate is made from a material selected from the group consisting of Si, SiC, titanium oxides and other titanium compounds, magnesium oxide, zirconium oxide, nickel, chromium, Ni-chromium compounds, $Al_2O_3$, yttrium compounds, and that the membrane layer consists of $Si_3N_4$, SiC, a combination of the two substances or another silicon ceramic.

31. A method as in claim 13, wherein the microwave radiation lies in a frequency range at which the material of the membrane layer has a peak in its absorption curve.

32. The filter element of claim 20 wherein the increased strength had been imparted to the membrane layer material after application of the membrane layer material to the carrier layer.

* * * * *

UNITED STATES PATENT AND TRADEMARK OFFICE
CERTIFICATE OF CORRECTION

| | | |
|---|---|---|
| PATENT NO. | : 7,655,075 B2 | Page 1 of 1 |
| APPLICATION NO. | : 10/564333 | |
| DATED | : February 2, 2010 | |
| INVENTOR(S) | : Hofmann | |

It is certified that error appears in the above-identified patent and that said Letters Patent is hereby corrected as shown below:

On the Title Page, Item 73, Assignee:

"NFT Nonofiltertechnik Gesellschaft Mit Beschrankter Haftung, Bad Homburg (DE)"

should read

-- NFT Nanofiltertechnik Gesellschaft Mit Beschrankter Haftung, Bad Homburg (DE) --.

On the Title Page, Item 30, Foreign Application Priority Data:

"Nov. 18, 2003 (DE) ...................... 103 53 894"

should read

-- Nov. 18, 2003 (DE) ...................... 103 53 894.1 --.

Signed and Sealed this

Thirtieth Day of March, 2010

David J. Kappos
*Director of the United States Patent and Trademark Office*